United States Patent [19]

Seefeld et al.

[11] 4,244,167
[45] Jan. 13, 1981

[54] ROTARY BALER FOR FORMING CYLINDRICAL HAY BALES

[75] Inventors: Dean E. Seefeld; Hallis D. Campbell, both of West Bend, Wis.

[73] Assignee: Gehl Company, West Bend, Wis.

[21] Appl. No.: 69,987

[22] Filed: Aug. 27, 1979

[51] Int. Cl.³ ............................................. A01D 39/00
[52] U.S. Cl. ....................................................... 56/341
[58] Field of Search ........................... 56/341, 342, 343

[56] References Cited

U.S. PATENT DOCUMENTS

| 2,775,339 | 12/1956 | Cadier | 56/341 UX |
| 3,914,926 | 10/1975 | Braunberger et al. | 56/341 UX |
| 4,150,527 | 4/1979 | Meiers | 56/341 UX |

OTHER PUBLICATIONS

Allis Chalmers–"New Roto-Baler" brochure, pp. 10 & relied on.

Primary Examiner—F. Barry Shay
Attorney, Agent, or Firm—James E. Nilles

[57] ABSTRACT

A machine for forming cylindrical bales of crop material such as hay in which the bale is formed between two oppositely moving endless belts. One of the belts wraps around the bale as the bale is being formed and the tensioned belt contributes to the density of the bale. A pressure roller helps support its bale and penetrates the periphery of the bale to increase its density. Crop deflector means are provided at each side of the interior of the machine so as to reduce the friction between the material and the sides of the machine and thereby prevent excessive tension on the belt and consequently excessive bale density.

3 Claims, 5 Drawing Figures

ROTARY BALER FOR FORMING CYLINDRICAL HAY BALES

BACKGROUND OF THE INVENTION

This invention relates to a machine for forming cylindrical bales of crop material for example, such as hay or the like, and in which the bale is formed between the rearwardly moving upper run of a lower conveyor and the forwardly moving lower run of an upper conveyor. The upper conveyor includes a plurality of side-by-side arranged individual belts and which are trained around supporting rollers. This upper conveyor is maintained around the bale as the latter grows in size. The tensioning of the upper conveyor or compacting belt as it is commonly known is accomplished by the subject matter shown in the co-pending patent application Ser. No. 69,997 filed Aug. 27, 1979 and entitled "Cylindrical Bale Forming Machine Having Hydraulic Control Means For Controlling The Bale Density", which has been assigned to an assignee common with the present invention.

The present invention is an improvement over the U.S. Pat. No. 4,150,527 issued Apr. 24, 1979 and entitled "Machine for Forming Cylindrical Hay Bales" and which discloses a pair of rollers on which the bale is supported and which act to penetrate the bale as it is being formed to thereby control the density of the bale.

In machines of this general character, the effect of friction between the material and the side walls of the machine can be detrimental to bale formation, that is to say, when high moisture content conditions of the crop are encountered, an excessive friction between the material and the side walls produces excessive compacting belt driving tension. The placement of the material as it enters the baling chamber for example to one side or the other also creates excessive side sheet friction with resulting excessive compacting belt tension and bales of undesirably high density. In crops which are baled at high moisture content, the side sheet friction and the upper belt tension are inter-related by the Bulk-modulus or Poissons effect, which effect tends to produce a feedback relationship between the compacting belt driving tension and the side sheet friction which in turn produces bales of excessive bale density and corresponding compacting belt driving tension.

The present invention is an improvement over the U.S. Pat. No. 3,914,926 issued Oct. 28, 1975 and which is assigned to an assignee common with the present application. The device shown in that patent utilizes large tension springs for maintaining the tension in the upper compacting belts and also utilizes a one-piece conveyor which extends from the pickup unit at the front of the machine, rearwardly to the rear end of the machine adjacent the discharge gate.

Generally, in such baling machines, hay is received by the baler between a feed roller and the conveying belt and is pressed into a flat thin mass from which it passes to a core forming area where it is rolled between the upper flight of the conveyor belt and the lower oppositely moving flight of the compacting belt. Thereafter, the thin mass of hay is rolled about the core into a bale which continues to increase in size until the desired size is achieved. During its formation, the bale is formed in a zone in which it is confined between the conveyor belt and the upper compacting belt.

SUMMARY OF THE INVENTION

The present invention provides a machine for producing cylindrical bales of crop material having cooperative oppositely moving belt flights between which the bale is formed and which also has a pressure roller on which the bale is positioned whereby the pressure roller penetrates the periphery of the bale and enhances and governs its density. The machine also has deflector means for reducing side sheet friction between the material and the interior side walls of the machine, with the pressure roller and deflecting means acting together to produce the proper amount of driving tension in the upper compacting belt and consequently proper bale density, and also proper power requirements, all of which are not overly sensitive to moisture conditions of the crop being baled. The machine of the present invention produces a coordinated relationship between the upper belt driving tension and the side sheet friction in the machine, which results in bales of proper density and proper compacting belt tension, particularly in higher moisture conditions of the crop. A more specific aspect of the invention relates to a machine of the above type in which the deflector means are vertical crop deflector shields provided on the inside walls of the baler and which deflect the crop away from the sides of the baler and thereby reduces the effect of side sheet friction. The bale density is thereby principally governed by the compaction of the crop material due to the penetration of the pressure roller beneath the bale at the location where the material rolls onto the bale being formed.

These and other objects and advantages of the present invention will appear hereinafter as this disclosure progresses, reference being had to the accompanying drawings.

THE DRAWINGS

DESCRIPTION OF A PREFERRED EMBODIMENT

The present invention is an improvement over the subject matter of the said U.S. Pat. No. 3,914,926 and much of the structure and operation of the device of that patent is similar to the machine of the present invention. Therefore, a greatly detailed description of the present baler is deemed to be neither necessary nor desirable, but reference may be had to said patent is such is desired.

It is believed sufficient to say for purposes of this disclosure that a cylindrical bale forming machine which embodies the present invention includes a mobile frame F supported in elevated and transportable position over the ground by the ground engaging wheels 1.

A tongue structure (not shown) extends forwardly of the frame and has its forward end connected to a conventional towing vehicle, such as a tractor, not shown. Power is supplied to the baling machine from the power take-off shaft of the tractor and is adapted to be connected to the machine for operating various mechanisms thereof.

Figure 1:
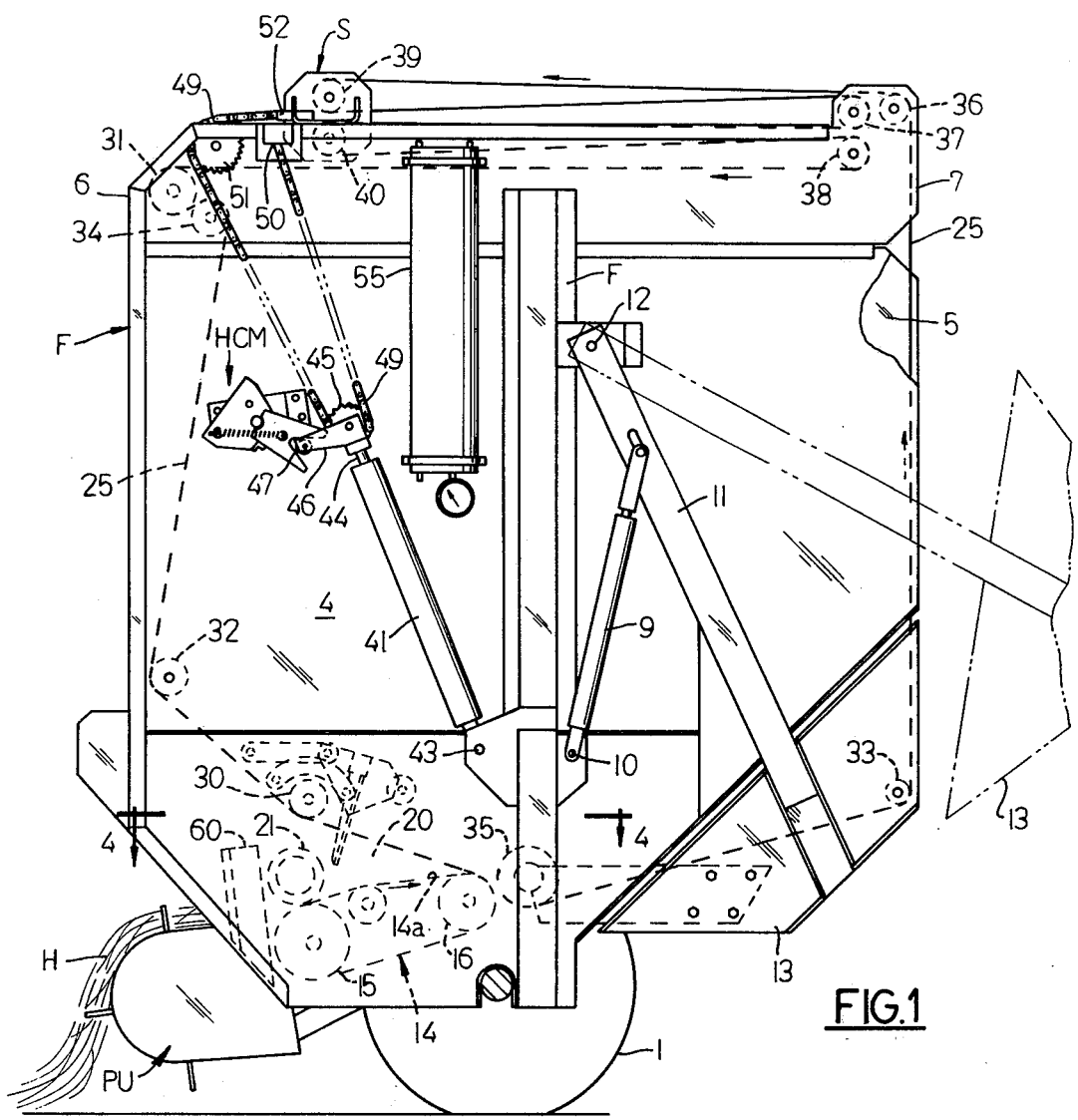
FIG. 1 is a left, side elevational view of a machine made in accordance with the present invention.

A rotary crop pick-up mechanism PU which rotates about a horizontal transverse axis is suspended below the tongue from a forward position of the frame where it can be lowered into crop engaging position for delivery of the crop, such as hay H to the baling machine as indicated in FIG. 1.

The main frame of the machine includes a pair of vertically disposed and spaced apart side walls 4 and 5 which are held apart in parallel relationship to each other by frame cross members such as shown at 6 and 7. A pair of large hydraulic cylinders 9, one on each side of the machine, are pivoted at their lower ends at 10 to the frame, and are connected at their upper ends to a frame member 11 so that extension of these hydraulic cylinders act to swing the rear end of the baler about the pivot point 12 (see broken lines in FIG. 1) to thereby open the rear end gate 13 of the machine to discharge the completely formed bale.

Figure 2:
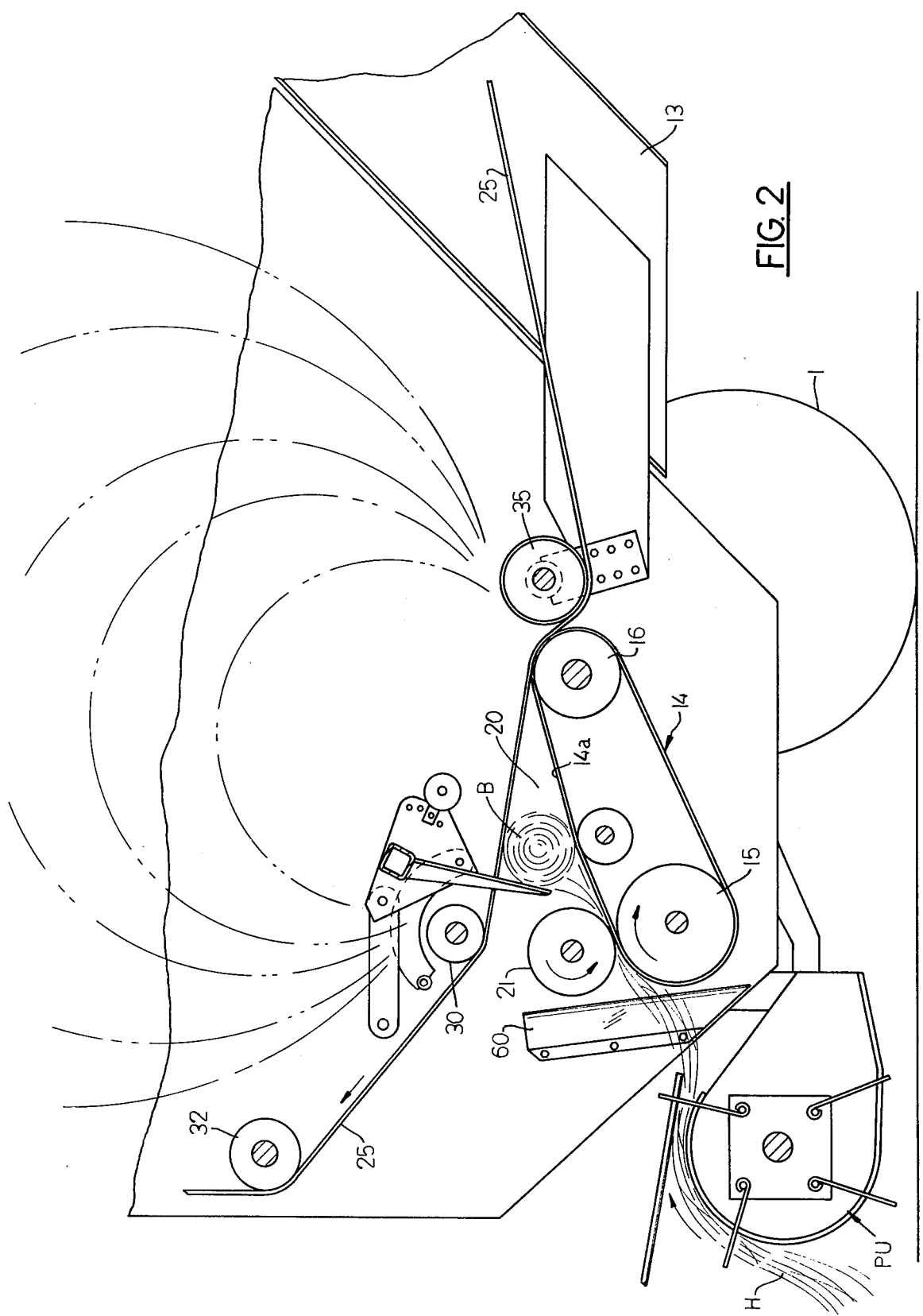
FIG. 2 is an enlarged, fragmentary view in longitudinal section, of a portion of the machine shown in FIG. 1, certain parts being removed or broken away for the sake of clarity and showing the bale shortly after its formation has commenced.

Disposed between the side walls 4 and 5 is a conveyor belt assembly 14 which extends for the full width between the side walls and has an upper flight 14a which forms a conveying platform for receiving crop material H from the pick-up unit PU and moving it rearwardly into a bale forming zone 20 (FIG. 2). The conveyor or belt 14 is trained around transverse rollers 15 and 16. A feeding or packer roll 21 is provided adjacent the front end of the conveyor roll 15 for cooperation therewith and between which the crop material passes.

A large endless compacting means, such as belt 25 (comprised of a series of belts) is trained around rollers in the frame. The lower flight of the compacting means or belt 25 together with the conveyor belt 14 constitute a cooperative means that defines the bale-forming zone or baling chamber 20. This compacting belt 25 is trained around lower drive rollers 30 and 32, an upper drive roller 31, idler rollers 33, 34, a main support or pressure roller 35, tailgate rollers 36, 37 and 38, and also around the shuttle rollers 39 and 40, the latter two of which are journalled on the longitudinally movable shuttle S.

Figures 3, 5:
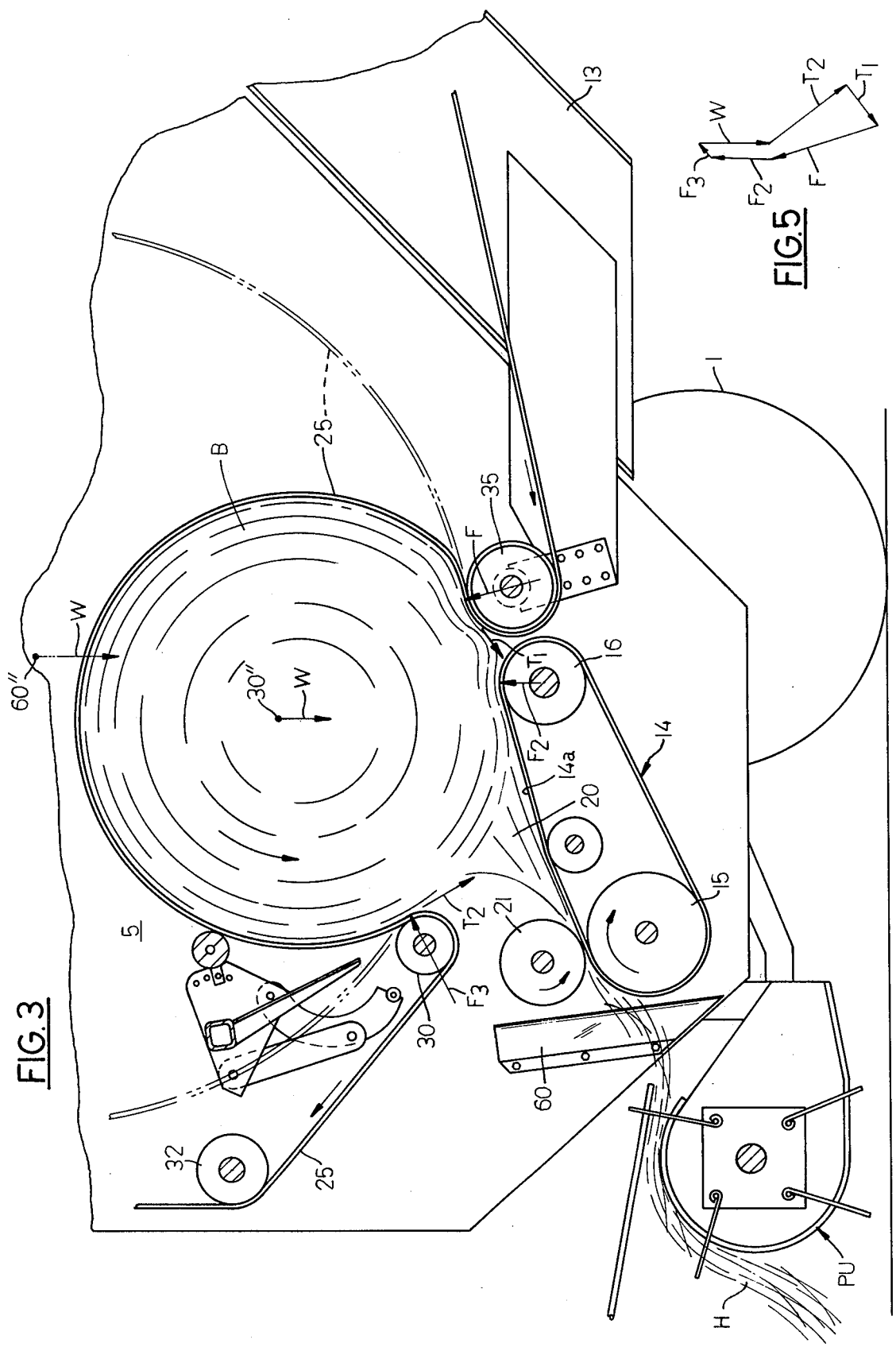
FIG. 3 is a view similar to FIG. 2 but showing the bale after it has grown considerably in size and certain of the parts in the machine shifted to other positions.
FIG. 5 is a force diagram of the various forces involved.

The shuttle S is shiftably mounted and guided for fore and aft movement on top of the frame in the known manner and is in the forward position as shown in FIG. 1 when there is no bale being formed in the baling chamber 20. As the bale B is formed and grows in size as shown in FIGS. 2 and 3, the shuttle moves rearwardly, in the known manner, so as to provide sufficient length to tightly surround the bale being formed and regulate the density of the bale.

A hydraulic control means HCM (FIG. 1) is provided for maintaining tension in the compacting belt 25 and consequently helping to insure proper density of the bale being formed.

The control mechanism HCM includes a hydraulic cylinder means in the form of a pair of extensible large hydraulic cylinders 41, one cylinder being mounted on each side of the machine and pivoted at its lower end as at 43 to the frame of the machine. Piston 44 of cylinder 41 has a chain sprocket 45 rotatably mounted thereon by means of bracket 46. The outer end of the bracket 46 has a roller 47 journalled thereon. Flexible connecting means in the form of a sprocket chain 49 extends around sprocket 45 and one of its ends is anchored at 50 to the machine frame. The sprocket chain 49 extends around a larger sprocket 51 journalled on the frame of the machine and the other end of the sprocket chain 52 is anchored on the shuttle S. A similar sprocket and chain arrangement is provided for the cylinder located on the other side of the machine (not shown). A reservoir 55 is mounted on the machine and contains hydraulic fluid such as oil under pressure.

When the bale B starts to form, cylinders 41 are in the position shown in FIG. 1. When the bale formation commences, and the bale starts to rotate and reaches a predetermined size, the hydraulic control mechanism HCM is actuated resulting in higher compacting belt tension. As the bale continues to grow, the shuttle S shifts rearwardly along the top of the baler, thereby causing the hydraulic cylinders 41 to extend further. When the bale has reached the maximum size, the shuttle has moved to the fully rearward position and the hydraulic cylinders are fully extended. The bale is wrapped by conventional means (not shown) and the baler gate is then opened by the other hydraulic cylinders 9 actuated by the tractor hydraulics (not shown).

If a more complete description of the structure and operation of the hydraulic control mechanism HCM is deemed to be necessary or desirable, reference may be had to the co-pending patent application Ser. No. 69,997 filed Aug. 27, 1979 and entitled "Cylindrical Bale Forming Machine Having Hydraulic Control Means For Controlling The Bale Density".

Figure 4:
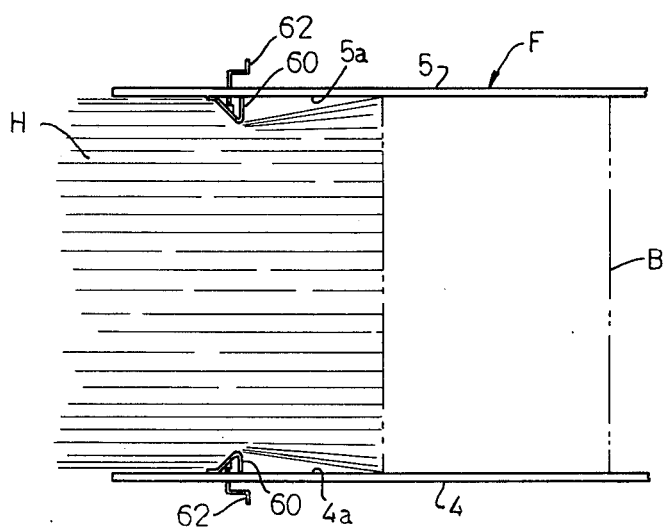
FIG. 4 is a schematic sectional view taken generally along the line 4—4 in FIG. 1.

In accordance with the present invention, a crop guiding shield 60 is provided which is secured to each of the inner sides of the machine and just forwardly of the feeder roll 21. These shields are generally vertically disposed and as shown in FIG. 4, converge in a rearward direction towards one another so as to deflect the incoming crop material away from the inner surfaces 4a and 5a of the side walls in the machine thereby reducing side sheet friction, that is friction between the incoming crop material and the interior of the side walls of the machine. As an alternate form, the crop shield 60 can be located rearwardly of the feeder roll 21 and the result is the same; namely, to deflect the crop away from the sides of the baler and thereby reduce the effect of side sheet friction. The distance which the sheet metal crop deflectors move the crop material away from the sides of the machine can be adjustable by means of the crank members 62 (FIG. 4) which threadably engage the side walls of the frame, bear against the deflectors, and extend outwardly of the frame for manual adjustment.

The relatively large diameter pressure roller 35 constitutes a main support roller for the bale and is located at a higher elevation than roller 16. This roller is preferably of about six inch diameter which has been found to provide the proper amount of bale penetration and still provide good rolling characteristics with the bale. The other rollers of belt means 25 are of about four inch diameter.

As shown in FIG. 3, the penetrating force of the roller acts generally along the vector F. The force of the weight of the bale is indicated by the reference W for 30 and 60 inch bales. The approximation of the force diagram shown in FIG. 5 illustrates the various other forces present. $F_2$ represents the force provided by roller 16, $F_3$ is the normal force of the roller 30, $T_2$ is the force of the tight side tension and $T_1$ is the slack side tension from the shuttle. Roller 35 acts as a penetrating roller and penetrates the periphery of the bale as it is being formed, thereby creates an area or zone of high pressure at a location where the upper belt then immediately holds the compressed material. Thus the roller applies pressure to the bale at a critical area to consequently increase the density of the bale being formed. In the meantime, the compacting belt 25 acts to maintain the pressure on the bale that has been imparted to it by the relatively large pressure roller 35.

With the above described arrangement, even though the crop material being baled can be of high moisture content, the bale density is governed by the compaction of the material at the pressure roll. As a result, high tension in the compacting belt which would otherwise be produced by high side sheet friction is minimized. Thus, even though the crop material is of high moisture content and/or the lateral placement of the crop material in the bale chamber is to one side or the other, the bales which are produced are of proper density and not of undesirably excessive density and furthermore excessive tension in the compacting belt 25 is avoided and power requirements are reduced.

With the present invention, the dominating influence of bale density is governed by the application of a constant pressure at the point where the crop material rolls onto the bale. Furthermore, the undesirable effect of having compacting belt driving tension, bale density, and power requirements of the machine all overly sensitive to moisture conditions of the crop, is eliminated.

We claim:

1. A rotary baler for forming cylindrical bales of crop material comprising, means for transporting said baler over the crop material to be baled, a pick-up mechanism for feeding the crop material to the baler, cooperative means carried by the baler defining a bale-forming zone for receiving crop material and in which zone a bale can grow in diameter, a pair of vertically extending side walls, one wall at each side of said cooperative means, said cooperative means including a tensioned compacting endless means which is continuously wrapped around the growing bale to provide bale density, a support pressure roller arranged transversely in said baler and over which said compacting means is trained and located in the lower portion of said zone to thereby penetrate the periphery of the bale being formed to increase the density of said bale, and crop material guiding means at the interior surface of each side wall and converging rearwardly toward one another to deflect the crop material which is delivered by said pick-up mechanism inwardly away from said side walls as it enters said zone to thereby reduce side sheet friction between said crop material and said side walls to avoid excessive compacting means tension and permit bale density to be governed by said support pressure roller.

2. The baler set forth in claim 1 further characterized in that said crop material guiding means comprises a vertically disposed shield secured adjacent the said interior of each side wall.

3. A machine for forming a cylindrical bale of cut crop material comprising: a mobile frame, a conveyor movably supported on said frame and including an upper flight movable rearwardly relative to said frame, means on said frame for picking up and delivering material to be baled to said conveyor, endless compacting means movable and supported on said frame and being guided to form a lower flight movable in a forward direction relative to said frame, said upper and lower flights thereby defining a bale-forming zone wherein they operate by moving in opposite directions for rotating crop material therebetween to form a rotating cylindrical bale with its bottom surface portion moving rearwardly; a pair of vetically extending side walls, one wall on each side of said frame, a support pressure roller arranged transversely in said baler and over which said compacting means is trained and located beneath said zone to thereby penetrate the periphery of the bale being formed to increase the density of said bale, a vertically disposed crop material guiding shield secured to project from the interior surface of each side wall and converging rearwardly toward one another to deflect the crop material which is delivered by said pick-up mechansim inwardly away from said side walls as it enters said zone to thereby reduce side sheet friction between said crop material and said side walls to avoid excessive compacting means tension and permit bale density to be governed by said support pressure roller.

* * * * *